Dec. 23, 1952     C. L. BODWELL     2,622,363
BAIT HOLDER
Filed Aug. 1, 1950
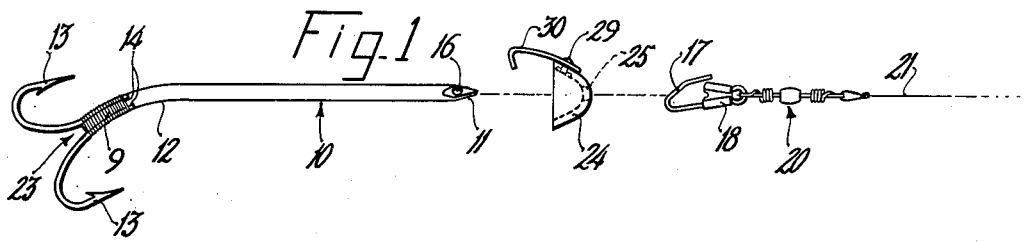
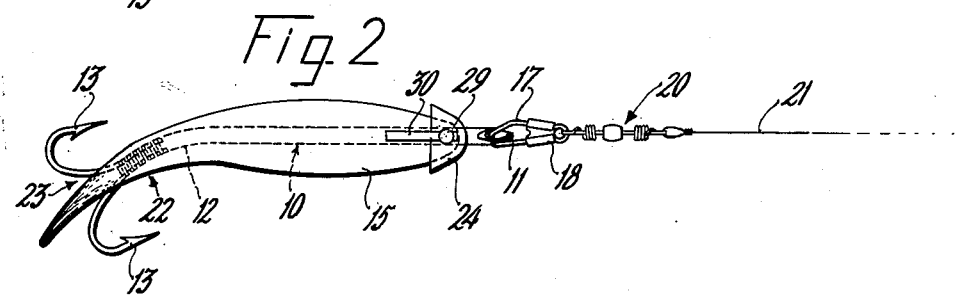
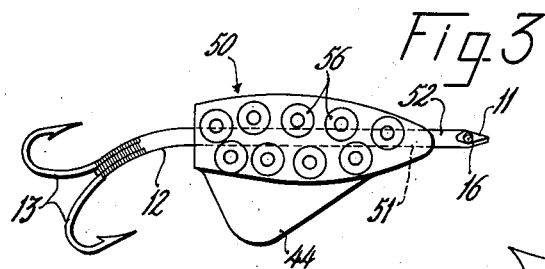
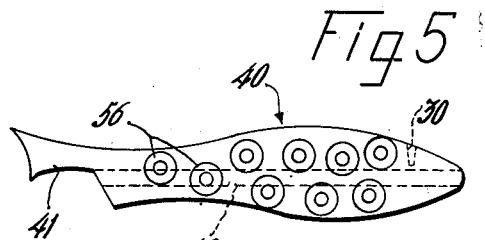
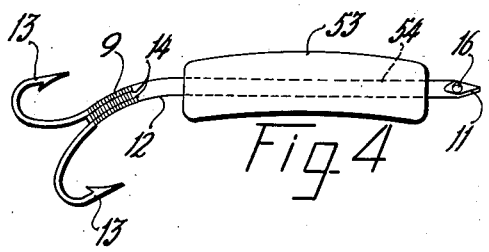
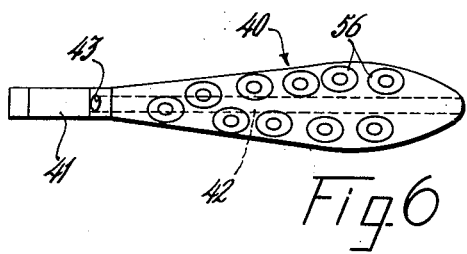
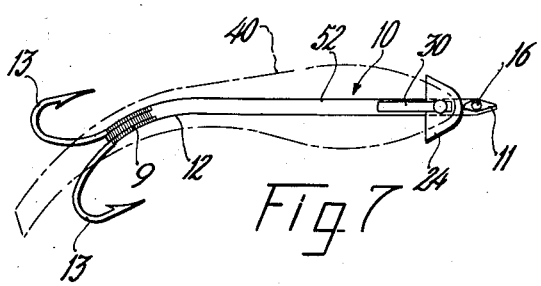
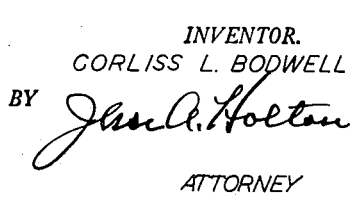
INVENTOR.
CORLISS L. BODWELL
BY
ATTORNEY Patented Dec. 23, 1952

2,622,363

UNITED STATES PATENT OFFICE 2,622,363

BAIT HOLDER

Corliss L. Bodwell, Springvale, Maine

Application August 1, 1950, Serial No. 177,081

2 Claims. (Cl. 43—44.2)

This invention relates to fishing rigs and particularly to improved bait-impaling fish-hook shanks and devices for securing them to a fish line.

One of the objects of the present invention is to provide a device of great simplicity for readily impaling a live or artificial minnow bait and securing it in a position to simulate a wounded minnow as it is drawn through the water.

It is well known that game fish when seeking food will enter a school of moving minnows and especially attack one which appears to be wavering or turning to present its side toward the surface of the body of water. For this reason it has been a practice among fishermen for many years to "sew-on" their live-minnow bait in a laborious and time consuming manner but with the end result that the minnow, particularly at the rear and tail portions, is curved out of its normally straight line and is maintained in such a fashion as the fish line is drawn through the water. The curvature causes a wavering of the minnow in which the lighter colored bottom surface of the bait is variously moved to catch light rays and attract the game fish.

Prior attempts have been made to devise means to effect the curvature of minnow bait but these have failed to attain commercial success because of their complexity, cost of manufacture, difficulty of assembly, uncertainty of operation and for other reasons.

It is, therefore, an objective of the present invention to provide an extremely low-cost device to serve the stated purpose, and one which may be quickly and easily manipulated to obtain the desired effect.

It is another object of the invention to provide a device which is readily adaptable for use with either live-bait minnows or artificial-bait minnows and which also may have in an alternative assembly a simple plug, with or without curvature, for use with bait such as angle worms or so-called night-crawlers, on hooks which are also a part of the assembly.

The invention accordingly consists in the various combinations of elements, arrangements of parts and features of construction, which will be set forth in the following description and the scope of the application of which will be apparent from the appended claims.

In the drawings, wherein are set forth various possible embodiments of the invention:

Fig. 1 is a view of the unassembled parts used in perfecting a fishing rig involving the invention.

Fig. 2 is a view of an assembly of the parts shown in Fig. 1 with a live-bait minnow represented in the position which it assumes.

Fig. 3 is a view showing an alternative use of the invention with a plug part.

Fig. 4 is a view illustrative of another alternative use of the invention employing a somewhat different plug part.

Fig. 5 is a side view of an artificial-minnow bait adapted for use in an alternative assembly of the invention.

Fig. 6 is a bottom view of the bait shown in Fig. 5.

Fig. 7 is a view showing the bait of Figs. 5 and 6 in dotted line position in assembly with other parts of the invention.

Referring now more particularly to the drawings, a shank 10, preferably of stainless steel rod or wire, has a pointed forward end 11 and is curved in its approach to its rear end, as indicated at 12. One or more fish hooks 13 extend rearwardly from the rear end of the shank 10. While one such hook may be satisfactory in achieving some purposes of the invention, it is preferably, as will appear later, that at least two oppositely disposed hooks be used, to get best results for universal operation.

The fish hooks 13 are preferably separately produced and fastened to flattened sides 14 of the rear end portion of the shank 10 by a winding of fine copper wire 9 and a sweating operation. As clearly shown in Fig. 1 of the drawing, the shanks of the fish hooks are curved to correspond to the curvature of the curved end of the rod or shank 10 in such a manner that when the shanks of the fish hooks are secured to the rod 10, they appear as a continuation of the latter curve with one of said fish hooks 13 terminating in a reverse curve.

The assembly of the shank with a live-minnow bait, as indicated in Fig. 2, is done with extreme simplicity by penetrating the minnow 15, near the tail at the under side, with point 11 of the shank and passing the shank forwardly through the body of the minnow until the point passes out through the minnow's mouth and slightly beyond.

The point 11 has an eye at 16 through which clip 17 of a fastener 18 may be passed and the clip closed. The clip is attached to a conventional swivel 20 which in turn is attached to fish-line 21.

In passing the shank 10 through the minnow the narrowed rear body portion and tail of the minnow will conform in lateral curvature to the curvature of the rear portion of the shank, as indicated at 22 in Fig. 2, and when the minnow is fully impaled upon the shank the tail of the minnow fans slightly into the space 23 between the oppositely disposed hooks so as to tend to hold the minnow against displacement rotatively and longitudinally as well as to partially obscure the hooks.

However, to further insure against displacement of the impaled minnow, a cap 24 of rubber, or synthetic rubber, compound or a plastic, is provided with a small central hole 25 (Fig. 1), and the cap is introduced to the point 11 and forced on over the shank 10 until it fits around the mouth and head of the minnow. This, of course, is done prior to association of the clip fastener. A spring metal detent prong 30 is riveted or otherwise suitably secured to the cap as indicated at 29, and may yield in advancing the cap over the minnow's head. When the cap is in position this prong may be pressed into the minnow to serve the stated purpose.

In Figs. 5, 6 and 7 the invention is illustrated employing artificial-minnow bait 40. Any suitable flexible or pliable material may be used to form this artificial bait, the point being that it be adapted to conform to the shape of the shank as in the case of the live-minnow bait. The bait 40 is formed preferably with a tail section 41 to rest in assembled position between the spaced hooks 13 (Fig. 7), so as to hold its proper position of lateral curvature of the rear body and tail portion. If the material used is flexible it is desirable to provide a central longitudinal aperture 42 through the bait of a slightly larger diameter than the average diameter of the shank 10. The aperture 42 is shown in Fig. 6 as starting at 43 just forwardly of the tail section 41. A recess 30' (Fig. 5) adapts the bait-piece 40 to the prong 30 if the cap 24 is used in the assembly.

In Figs. 3 and 4 different forms of plugs are shown in combination with the shank 10 and hooks 13. In Fig. 3 a simple form of wooden plug 50 is shown provided with a central aperture 51 for fitting it over a forward straight portion 52 of the shank. A rudder 44 extends from the bottom of the plug to give a slight oscillatory movement to the plug as it is drawn through the water. In Fig. 4 a generally curved solid plug 53 is shown. It has a substantially central longitudinal aperture 54 to receive the straight length of the shank and may be with or without a rudder such as 44. The assemblies of Figs. 3 and 4 do not need the cap 24 and they may be used as shown or they may be used with the hooks 13 impaling various forms of live bait.

Obviously, the artificial bait pieces used, either those of the flexible or pliable type shown in Figs. 5, 6 and 7, or the solid type shown in Figs. 3 and 4, may bear designs in color to suit. Such designs are suggested by the markings 56 in some of said figures.

By the parts above described, a fishing rig is provided in which the application to live-minnow bait is by one simple operation of penetrating the minnow at the bottom rear and sliding the minnow along until its rear and tail portion must take the desired curve. At this point in the operation the point of the shank has passed beyond the minnow and the eye of the point is exposed for attachment of the clip fastener. For the careful and experienced fisherman this may be all that has to be done to complete the rig, but additional assurance is achieved by the use of the cap 24 and by the use of the prong 30. By such a shank with its hooks attached all necessity is obviated to have tubular or telescopic shanks with snap-on hook-sections or to have enlarged loop members which must be passed rearwardly through the body and skin of the bait fish to receive separate hook members which must later again be drawn into the fish before the assembly is complete.

The basic single shank with forward point and eye and rearward curve culminating in spaced hooks, provides also all of the alternative assemblies hereinbefore described, at a minimum cost for the foundation structure and a simplicity in assembly operation never before achieved.

What is claimed is:

1. A fishing device comprising a rod, straight throughout a major portion of its length, pointed at one end and curved only at the other end; hooks having curved shanks, the curves of the shanks of the hooks corresponding to the curvature of the curved end of the rod and being secured thereto so as to appear as a continuation of the latter curve, said hooks having pointed portions on opposite sides of the portions secured to the rod; and the pointed end of the rod being provided with an opening to which line attaching means can be secured.

2. A fishing device comprising an impaling shank having a long straight forward portion with a pointed end, and a rear portion with a lateral curvature; fish hooks, oppositely disposed on and having shanks united with said rear portion, one of the fish-hook-shanks continuing in the same direction of curvature as said rear portion and the other fish-hook-shank forming a reverse curve with respect to said rear portion.

CORLISS L. BODWELL.

REFERENCES CITED

The following references are of record in the file of this patent:

UNITED STATES PATENTS

| Number | Name | Date |
|---|---|---|
| 2,316,048 | Clarke | Apr. 6, 1943 |
| 2,518,593 | Bell | Aug. 15, 1950 |

FOREIGN PATENTS

| Number | Country | Date |
|---|---|---|
| 226,687 | Great Britain | Jan. 1, 1925 |